US012794571B2

(12) United States Patent
Berker et al.

(10) Patent No.: US 12,794,571 B2
(45) Date of Patent: Nov. 10, 2026

(54) ANTENNA SYSTEMS AND METHODS

(71) Applicants: Noyan Berker, Istanbul (TR); Serdar Serttop, Istanbul (TR); James Alfred Stubstad, Santa Clara, CA (US)

(72) Inventors: Noyan Berker, Istanbul (TR); Serdar Serttop, Istanbul (TR); James Alfred Stubstad, Santa Clara, CA (US)

( * ) Notice: Subject to any disclaimer, the term of this patent is extended or adjusted under 35 U.S.C. 154(b) by 296 days.

(21) Appl. No.: 18/208,868

(22) Filed: Jun. 12, 2023

(65) Prior Publication Data

US 2024/0121014 A1 Apr. 11, 2024

Related U.S. Application Data

(63) Continuation-in-part of application No. 17/955,512, filed on Sep. 28, 2022, now abandoned.

(60) Provisional application No. 63/249,026, filed on Sep. 28, 2021.

(51) Int. Cl.
*H04B 17/10* (2015.01)

(52) U.S. Cl.
CPC .................................. *H04B 17/101* (2015.01)

(58) Field of Classification Search
CPC .................................................... H04B 17/101
See application file for complete search history.

(56) References Cited

U.S. PATENT DOCUMENTS

| | | | | |
|---|---|---|---|---|
| 6,055,431 A * | 4/2000 | Dybdal | .............. | H04B 7/18515 455/450 |
| 2001/0005685 A1* | 6/2001 | Nishimori | ............ | H01Q 3/2605 455/562.1 |
| 2021/0143902 A1* | 5/2021 | Connolly | ............. | H04B 7/2656 |

* cited by examiner

*Primary Examiner* — Hsinchun Liao

(57) ABSTRACT

A method for managing an antenna device, the method comprising: providing the antenna device wherein the antenna device comprises: at least one adaptive antenna array, wherein a gain and a pattern of the at least one adaptive antenna array is remotely managed electronically a control radio contained within the antenna device, wherein the antenna device is integrated into a gateway, wherein the antenna device is powered through an RF-DC multiplexing circuit located next to the gateway, wherein the antenna device maintains one or more switched port(s) where a pre-existing fixed antenna is coupled, wherein the control radio shares a plurality of antennas provided for the LoRa gateway wherein an uppermost portion of antenna device comprises the at least one adaptive antenna array, wherein a bottom of the antenna array comprises a circuit board carries switching and phasing circuits that drive the array elements and connections for the LoRa gateway radio frequency (RF) signals and for an external antenna, and inserting the antenna device at the antenna end of a cable between a LoRa gateway and the external antenna.

10 Claims, 2 Drawing Sheets

ANTENNA SYSTEMS AND METHODS

CLAIM OF PRIORITY

This application is a continuation in part of U.S. patent application Ser. No. 17/955,512, filed on Sep. 28, 2022 and titled MEMS OSCILLATOR OPERATIVE IN A LORAWAN GATEWAY. This patent application is incorporated by reference in its entirety.

U.S. patent application Ser. No. 17/955,512 claims priority to U.S. Provisional Application No. 63/249,026 filed on Sep. 28, 2021 and titled ANTENNA SYSTEMS AND METHODS. This provisional application is incorporated by reference in its entirety.

BACKGROUND

LoRa network access gateways are typically deployed with one, fixed antenna, generally omnidirectional, and when a high gain omni antenna and/or a highly directional antenna is used, the high gain pattern it adversely affects communication with devices at short range with significantly different elevation, or at other azimuths and elevations respectively. LoRa network access is usually deployed by individuals and uncoordinated third parties and often results in poor infrastructure efficiencies because of overlapping coverage competing for the same data transport and interference between closely spaced gateways. There is no provision in current LoRa networks to balance coverage or traffic or mitigate interference as a system. The problem to be solved is to be able to dynamically configure coverage area and/or mitigate interference or promote more efficient frequency use or to balance load by means of switched or adaptive antennas controlled from the cloud by an algorithm.

SUMMARY OF THE INVENTION

A method for managing an antenna device, the method comprising: providing the antenna device wherein the antenna device comprises: at least one adaptive antenna array, wherein a gain and a pattern of the at least one adaptive antenna array is remotely managed electronically a control radio contained within the antenna device, wherein the antenna device is integrated into a gateway, wherein the antenna device is powered through an RF-DC multiplexing circuit located next to the gateway, wherein the antenna device maintains one or more switched port(s) where a pre-existing fixed antenna is coupled, wherein the control radio shares a plurality of antennas provided for the LoRa gateway wherein an uppermost portion of antenna device comprises the at least one adaptive antenna array, wherein a bottom of the antenna array comprises a circuit board carries switching and phasing circuits that drive the array elements and connections for the LoRa gateway radio frequency (RF) signals and for an external antenna, and inserting the antenna device at the antenna end of a cable between a LoRa gateway and the external antenna.

Figure 1:
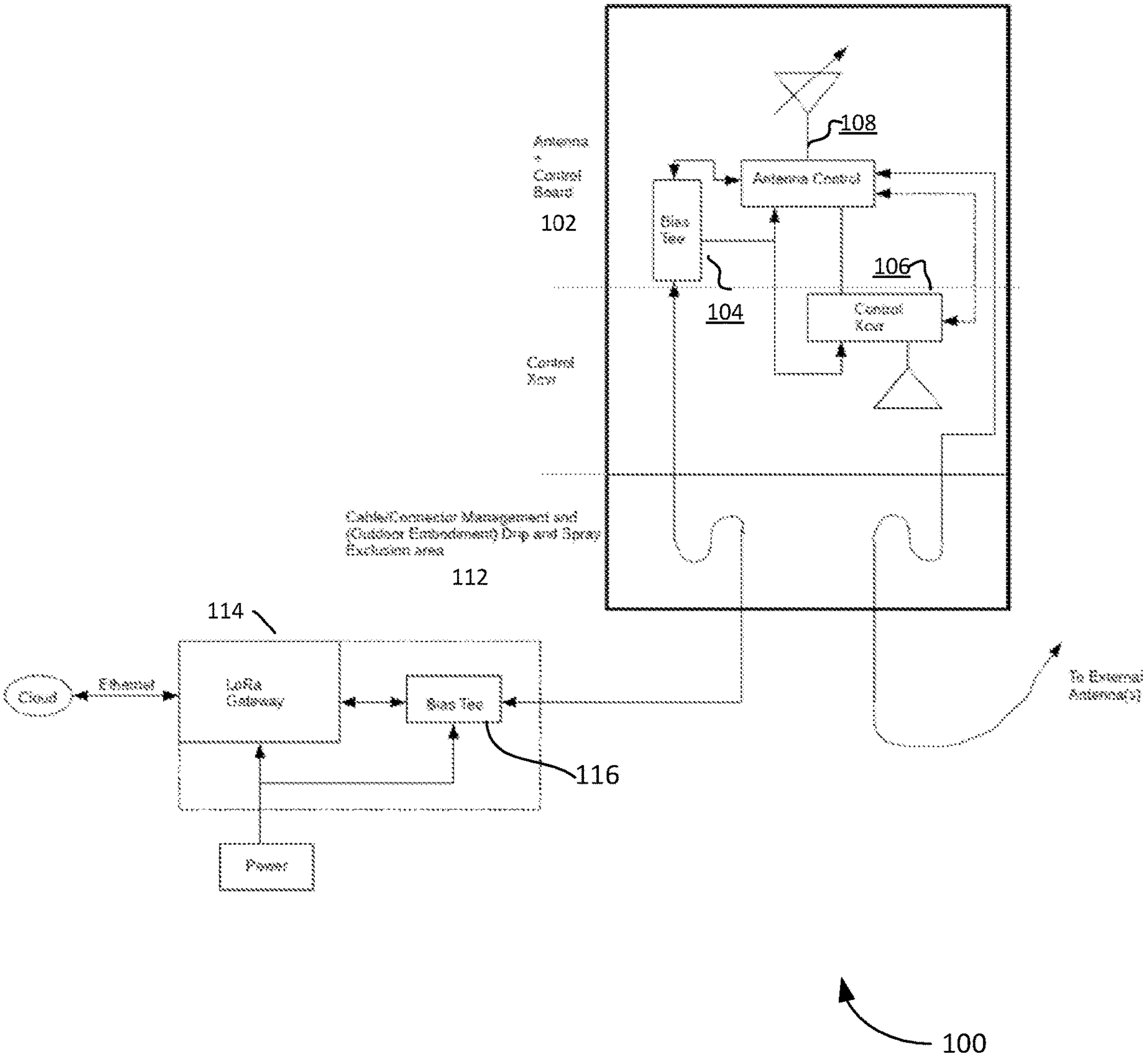
FIG. 1 illustrates an example high level block diagram of an antenna device, according to some embodiments.

The Figures described above are a representative set and are not an exhaustive with respect to embodying the invention.

DESCRIPTION

Disclosed are a system, method, and article of manufacture for antennas. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to ‘one embodiment,’ ‘an embodiment,’ ‘one example,’ or similar language means that a particular feature, structure, or characteristic described in connection with the embodiment is included in at least one embodiment, according to some embodiments. Thus, appearances of the phrases ‘in one embodiment,’ ‘in an embodiment,’ and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Bias tee is a three-port network used for setting the DC bias point of some electronic components without disturbing other components. The bias tee is a diplexer. The low-frequency port is used to set the bias; the high-frequency port passes the radio-frequency signals but blocks the biasing levels; the combined port connects to the device, which sees both the bias and RF.

LoRa (Long Range) is a proprietary low-power wide-area network modulation technique.

LoRaWAN is one of several protocols that were developed to define the upper layers of the network. LoRaWAN is a cloud-based medium access control (MAC) layer protocol but acts mainly as a network layer protocol for managing communication between LPWAN gateways and end-node devices as a routing protocol. LoRaWAN defines the communication protocol and system architecture for the network, while the LoRa physical layer enables the long-range communication link. LoRaWAN is also responsible for managing the communication frequencies, data rate, and power for all devices.

Transceiver is an electronic device which is a combination of a radio transmitter and a receiver, hence the name. It can both transmit and receive radio waves using an antenna, for communication purposes.

Example Systems and Methods

FIG. 1 illustrates an example high level block diagram of an antenna device 100, according to some embodiments. The antenna device 100 includes antenna and control board 102. Antenna and control board 102 includes antenna control 106, bias tee 104 and control XCVR (transceiver) 108. Antenna and control board 102 can include a cable/connect management system 112. This can be for an outdoor embodiment (e.g. in a drip and spray exclusion area). Antenna and control board 102 is coupled with various external antenna systems and LoRa gateway 114 (e.g. via bias tee 116).

The antenna device 100 is inserted at the antenna end of the cable between a LoRa gateway and an external antenna (e.g. when external antenna is used). In one example embodiment, the device may be the only external antenna. In another example embodiments, the device may be deployed indoors in place of a single fixed indoor antenna.

Embodiments for outdoor use are constructed in a way to weatherize the antenna device 100 and external connections to the antenna device 100 (e.g. see infra). The antenna device 100 contains at least one adaptive antenna array, the gain and pattern of which can be remotely managed electronically via a LoRa, Bluetooth and/or Wi-Fi control radio contained within the antenna device 100.

The antenna device 100 may be powered through an RF-DC multiplexing circuit (e.g. a bias tee) located next to the gateway. The antenna device 100 can be integrated into the gateway. In this case, it can be powered from the same power source as the gateway and/or use separate power sources locally available at the device instead of multiplexing DC onto the cable between the gateway and the device.

The antenna device 100 may maintain one or more switched port(s) where a pre-existing fixed antenna or any other specialized may be attached. This may include, but is not limited to: one or more long, high gain, collinear omni-directional arrays (e.g. used to extend coverage for LoRa gateways); high gain directive antennas (e.g. Yagi-Uda antennas) which are commonly used to connect an edge device into a network; circularly polarized hemispherical antennas (e.g. used for communications with a number of satellites over the visible sky); or high gain linear or circular polarized antennas (e.g. used for communications with geo-stationary satellites); etc.

In one example, for a lower BOM cost and power consumption, the antenna device 100 can use near baseband signals that pass through the DC port of the bias tee to provide low speed in cable control communications to the device available at a serial data port on an external bias tee or embedded in a gateway with internal bias tee.

The LoRa, Bluetooth or Wi-Fi control radio in the antenna device 100 may share the other antennas provided for the LoRa gateway and/or use it's own dedicated antenna(s). As shown in FIG. 1, the uppermost portion of antenna device 100 contains the adaptive antenna array. At the bottom of the antenna array a circuit board carries switching and phasing circuits that drive the array elements and connections for the LoRa gateway RF signals and for other external antenna(s). The antenna device 100 can obtain power by de-multiplexing DC power supplied along with the RF signals on the LoRa gateway port or supplied at the device if local power is used.

The board at the base of the array has provisions either directly or by extension elements to act as a counterpoise for antenna array embodiments which are ground dependent, such as, but not limited to vertical monopoles. The control radio in the device, along with any dedicated integrated antenna(s), may also be on the circuit board at the bottom of the antenna array, or may be on a separate board mounted lower within the enclosure.

For outdoor versions the antenna array and the circuit board(s) below are contained in a weatherproof enclosure that is sealed at the top, closed on the sides, and provides a volume below the electronics where external cables may be connected to connectors or connectorized cable tails recessed in the bottom of the antenna device 100 and securely stowed out of rain or directed spray. The cable exits can be constructed so as to provide for installation with external cable drip loops and weep holes are provided at the lowest point(s) of the enclosure to allow free exchange of vapor and to allow condensed water to drain. If penetrations are made through the side of the enclosure to facilitate mounting clamps, studs, or plates such as may be used to attach to the top of a mast, pipe, or support tube, they are placed at the bottom so that electronics and cable connections remain dry, and the antennas are above the end of the pipe. If the antenna device 100 is to be mounted lower on a tall mast, pipe, or support, or is to be mounted to the side of a wall or railing, a sidearm kit is used to provide sufficient spacing between the antenna device 100 and metallic objects projecting above the bottom of the antenna device 100 so as to minimize coupling between the device antennas and the metallic objects. Side mounting examples would be but are not limited to mast for pre-existing high gain LoRa antenna, TV or radio antenna, light standard, signage, or flagpole. If a method of attachment such as a ring or hole is provided at the top of the antenna device 100 enclosure and the descending cable is messengered for support with the messenger wire securely attached to the lowest part of the antenna device 100, the antenna device 100 may also be hung as a lanyard on insulating line from various existing supports including, but not limited to, projections from trees and buildings or lines strung between trees and or building features or sidearms, or antennas extending from existing masts.

Indoor versions of the antenna device 100 may not require the extended length below the active electronics to protect connections but may include cable or connector protection or management features, attachment features and/or weighting to remain in place when set in position.

Figure 2:
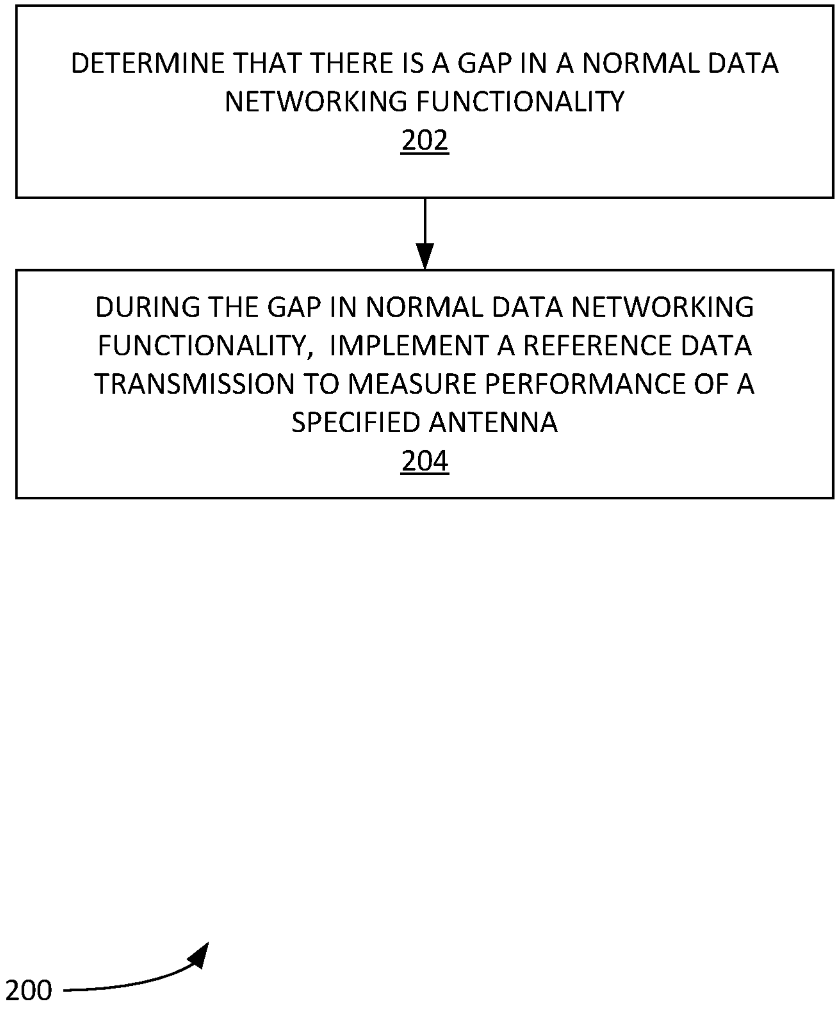
FIG. 2 illustrates an example process for managing antenna device 100, according to some embodiments.

FIG. 2 illustrates an example process 200 for managing antenna device 100, according to some embodiments. Process 200 can use reference data transmission to measure performance. Process 200 can use reference packets with local environment so it can assess latency and signal quality to other adjacent nodes. At time of sending reference transmissions, process 200 can time this in such a way as to turn off the transmissions of the main device (e.g. a main gateway). At this point, just the reference packets are transmitted, then process 200 can turn the main gateway back on. Process 200 can time this in such as way such that any time sensitive functions that are in progress on the main gateway are not affected. For example, if crypto-mining is being implemented then the main gateway is turned off such that the transmission of the reference packets does not affect the mining function. Process 200 can run, when there are gaps in a mining function for example. In this way, process 200 will not interrupt the normal data networking functionality. Process 200 can coordinate itself with specified cloud-based based functions that have a record when normal data networking functionality is occurring. These background activities can include, inter alia: transmitting reference packets, exploring the local environment, testing the various antennas with the smart antenna, etc.

More specifically, in step 202, process 200 can determine that there is a gap in a normal data networking functionality. In step 204, during the gap in normal data networking functionality, process 200 can implement a reference data transmission to measure performance of a specified antenna (e.g. a smart antenna system, etc.).

Antenna device 100 can be a smart antenna. Antenna device 100 can be a space optimized antenna. Satellites can be used to generate reference packets as well. A smart antenna can be optimized for space and can use reference packets from specified satellites. Receive amplification can be added to smart antenna systems described herein (e.g. an outdoor embodiment). Smart antenna systems can incorporate weather sensors. As noted, smart antenna can have an electronically steerable functionality.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States Patent:

1. A method for managing an antenna device, the method comprising:

providing the antenna device wherein the antenna device comprises:

at least one adaptive antenna array, wherein a gain and a pattern of the at least on adaptive antenna array is remotely managed electronically a control radio contained within the antenna device, wherein the antenna device is integrated into a gateway, wherein the antenna device is powered through an RF-DC multiplexing circuit located next to the gateway, wherein the antenna device maintains one or more switched port(s) where a pre-existing fixed antenna is coupled, wherein the control radio shares a plurality of antennas provided for the LoRa gateway wherein an uppermost portion of antenna device comprises the at least one adaptive antenna array, wherein a bottom of the antenna array comprises a circuit board carries switching and phasing circuits that drive the array elements and connections for the LoRa gateway radio frequency (RF) signals and for an external antenna, and inserting the antenna device at the antenna end of a cable between a LoRa gateway and the external antenna.

2. The method of claim 1, wherein the antenna device is integrated into an external antenna.

3. The method of claim 1, wherein the antenna device is deployed indoors in place of a single fixed indoor antenna.

4. The method of claim 3, wherein the control radio comprises a LoRa (Long Range) radio system.

5. The method of claim 4, wherein the control radio comprises a Bluetooth® radio system.

6. The method of claim 4, wherein the control radio comprises a Wi-Fi control radio system.

7. The method of claim 4, wherein the RF-DC multiplexing circuit comprises a bias tee.

8. The method of claim 4, wherein for a lower BOM cost and a lower power consumption, the antenna device uses near a set of baseband signals that pass through the direct current (DC) port of the bias tee to provide a low speed in a cable control communication to the antenna device available at a serial data port on an external bias tee or an embedded in a gateway with the bias tee.

9. The method of claim 4 further comprising:

determining that there is a gap in a normal data networking functionality.

10. The method of claim 9 further comprising:

during the gap in normal data networking functionality, implementing a reference data transmission to measure a performance of a specified antenna.

* * * * *